United States Patent
Todd (10) Patent No.: US 9,811,669 B1
(45) Date of Patent: Nov. 7, 2017

(54) METHOD AND APPARATUS FOR PRIVACY AUDIT SUPPORT VIA PROVENANCE-AWARE SYSTEMS

(71) Applicant: EMC IP Holding Company LLC, Hopkinton, MA (US)

(72) Inventor: Stephen J. Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 14/144,635

(22) Filed: Dec. 31, 2013

(51) Int. Cl.
    G06F 21/60      (2013.01)
    G06Q 10/00      (2012.01)
    G06T 11/20      (2006.01)
    G06F 17/30      (2006.01)

(52) U.S. Cl.
    CPC .............. G06F 21/60 (2013.01); G06Q 10/00 (2013.01); G06T 11/20 (2013.01); G06F 17/30011 (2013.01); G06F 17/30017 (2013.01); G06F 17/30038 (2013.01); G06F 17/30309 (2013.01); G06F 17/30368 (2013.01); G06F 17/30557 (2013.01); G06F 17/30705 (2013.01); G06F 17/30864 (2013.01); G06F 17/30946 (2013.01)

(58) Field of Classification Search
    CPC ....................................................... G06F 21/60
    See application file for complete search history.

(56) References Cited

U.S. PATENT DOCUMENTS

| | | | | |
|---|---|---|---|---|
| 7,725,433 B1* | 5/2010 | Labrie | ............... | G06F 17/30297 707/612 |
| 8,135,760 B1* | 3/2012 | Todd | ................. | G06F 17/30091 707/783 |
| 8,146,155 B1* | 3/2012 | Todd et al. | ...................... | 726/21 |
| 8,832,224 B1* | 9/2014 | Pauley | .................. | H04W 12/02 709/217 |
| 8,843,997 B1* | 9/2014 | Hare | ................... | H04L 63/0281 709/200 |
| 2011/0035241 A1* | 2/2011 | Camenisch | ............ | G06Q 10/00 705/74 |
| 2011/0088009 A1* | 4/2011 | Jones | .................... | G06F 9/4446 717/100 |

(Continued)

OTHER PUBLICATIONS

Itani et al., "An efficient and scalable Security Protocol for protecting fixed-content objects in content addresable storage architectures", pp. 63-72, Security and Privacy in Communications Networks and the Workshops, 2007. SecureComm 2007.*

(Continued)

*Primary Examiner* — Hadi Armouche
*Assistant Examiner* — Hee Song
(74) *Attorney, Agent, or Firm* — Ryan, Mason & Lewis, LLP (57) ABSTRACT

Example embodiments of the present invention relate to a method, an apparatus, and a computer program product for privacy audit support via provenance-aware systems. The method includes associating a first identifier with a first data object and associating a second identifier with a second data object derived from the first data object according to a control object. Metadata for the second data object identifying the first data object and identifying the control object then may be stored.

20 Claims, 6 Drawing Sheets

(56) References Cited

U.S. PATENT DOCUMENTS

| | | | |
|---|---|---|---|
| 2011/0202535 A1* | 8/2011 | Deolalikar | G06F 17/30705 707/739 |
| 2013/0018858 A1* | 1/2013 | Velasco | G06F 17/30017 707/694 |
| 2013/0018873 A1* | 1/2013 | Velasco | G06F 17/30038 707/723 |
| 2013/0332423 A1* | 12/2013 | Puri | G06F 17/30309 707/687 |
| 2014/0281545 A1* | 9/2014 | Erofeev et al. | 713/171 |
| 2015/0074152 A1* | 3/2015 | Boic | 707/803 |
| 2015/0089075 A1* | 3/2015 | Strigeus et al. | 709/231 |

OTHER PUBLICATIONS

Zhang et al., "How to Track Your Data: The Case for Cloud Computing Provenance", pp. 446-453. 2011 Third IEEE International conference on Cloud Computing Technology and Science.*

* cited by examiner

METHOD AND APPARATUS FOR PRIVACY AUDIT SUPPORT VIA PROVENANCE-AWARE SYSTEMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The field relates to computing systems, and more particularly to techniques for generating data provenance associated with such computing systems.

BACKGROUND

Data center operators are increasingly relying on the gathering of content from consumer endpoints. The hosting or ownership of massive amounts of consumer content can often mean increased revenue for data center operators and enhanced services for consumers. Consumers are often hesitant to part with private data for fear of privacy leakage on the part of data center operators.

Some storage systems receive and process access requests that identify a data unit or other content unit (also referred to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments OAS systems may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

SUMMARY

Example embodiments of the present invention relate to a method, an apparatus, and a computer program product for privacy audit support via provenance-aware systems. The method includes receiving a first data object having an associated second data object and storing the first data object including metadata identifying the associated second data object.

BRIEF DESCRIPTION OF THE DRAWINGS

The above and further advantages of the present invention may be better under stood by referring to the following description taken into conjunction with the accompanying drawings in which:

FIGS. 3A-5 are flow diagrams illustrating methods according to respective example embodiments of the present invention;

DETAILED DESCRIPTION

Customers and businesses are hesitant to part with personal or corporate data for fear of privacy leakage. In many cases they are willing to part with their data in large part due to the benefits they could receive in return. The problem for the data center operator is that traditional data centers do not have built-in provenance mechanisms that can trace the path of consumer data through a variety of analytic transformations and data exchanges in a way that is immutable and auditable. As a result they lack the ability to guarantee compliance and support audits.

Traditional data centers pose a number of problems for data center operators and consumers. For example, not only are "terms of use" for data sharing not commonly agreed upon in the industry, but statements made in such terms of use documents do not have a mapping to IT services that guarantee compliance in an auditable way. Further, as analytic processes transform and aggregate customer data, there is no method to capture the transformed output, link it back to one or more of the original data set and analytic algorithm, and preserve these associations in the context of the terms of use. The combination of these problems means that there is no method either to "spot audit" a data center operator by requesting a subset of the operators "terms of use" agreements and validating this subset is being enforced as part of the analysis of consumer data or to specifically audit and trace the trail of a very specific subset of consumer data in the case of a consumer challenging the data center operator's privacy controls.

Example embodiments of the present invention overcome these and other disadvantages by providing a new form of IT infrastructure which can offer consumers contractual and enforceable privacy guarantees and auditability from their data center operators. Combining terms of use with object-based, retention-capable lineage, however, holds the promise of a highly-efficient, tamper-proof audit capability for such a data center. Such object-based storage is described in U.S. patent application Ser. No. 11/864,943 entitled "CONTROLLING ACCESS TO CONTENT ON AN OBJECT ADDRESSABLE STORAGE SYSTEM," Ser. No. 11/933,686 entitled "DETERMINING THE LINEAGE OF A CONTENT UNIT ON AN OBJECT ADDRESSABLE STORAGE SYSTEM," and Ser. No. 13/333,307 entitled "DATA PROVENANCE IN COMPUTING INFRASTRUCTURE," all commonly assigned with the present application to EMC Corporation of Hopkinton, Mass., the teachings of which are incorporated herein by reference in their entirety. As described in these applications, an initial set of data (e.g., the customer's original data) may be stored and retained along with a transformative algorithm which may convert one or more data sources to a new state, the aggregated or analyzed results of which may be stored with immutable links pointing back to the input data sets and the algorithm.

Figure 1:
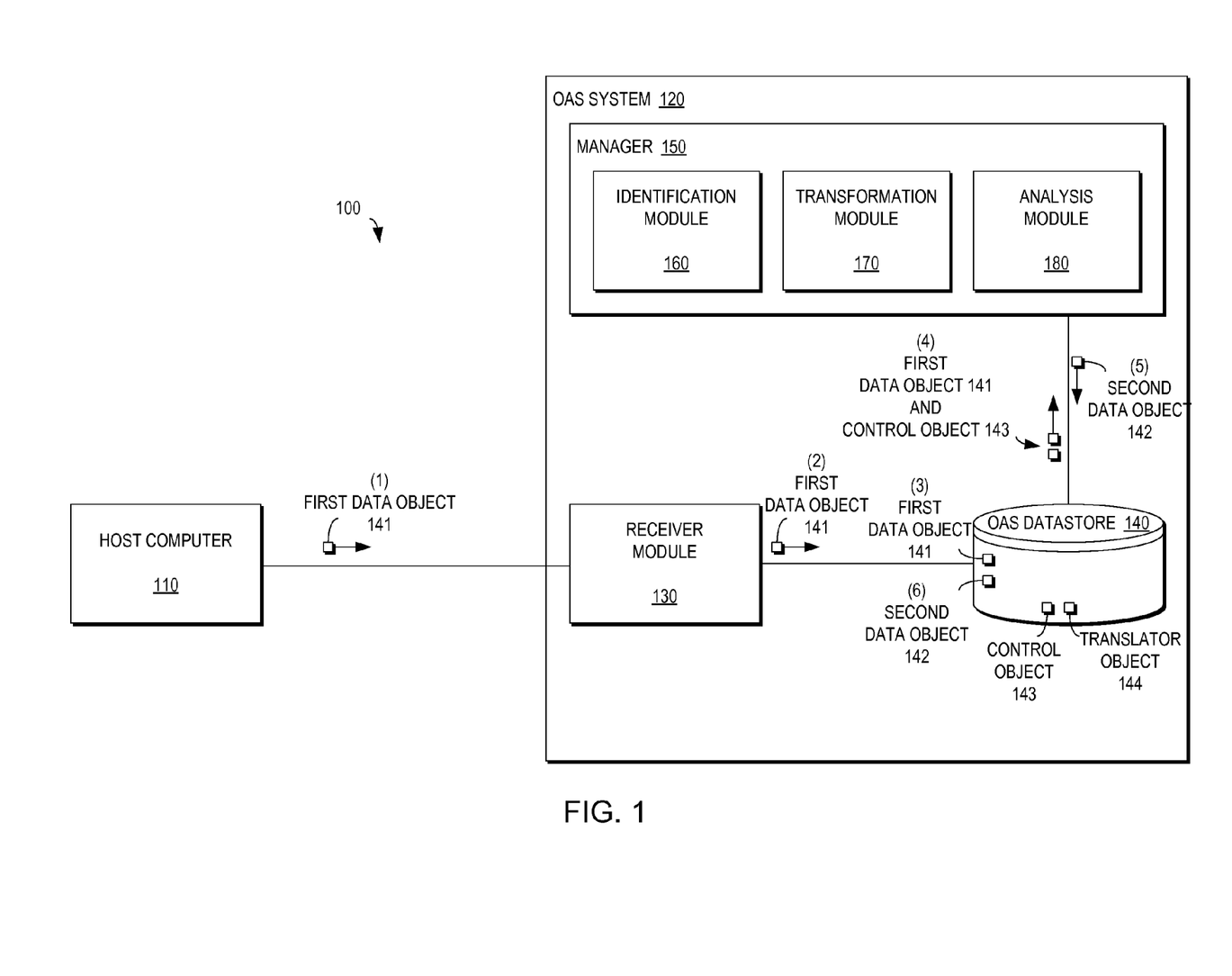
FIG. 1 is a block diagram of a system for maintaining data privacy and privacy auditing via a provenance-aware system, including a logic flow of a first data object stored to an object addressable storage (OAS) system, according to an example embodiment of the present invention.

FIG. 1 is a block diagram of a system 100 for maintaining data privacy and privacy auditing via a provenance-aware system (e.g., OAS system 120), including a logic flow of a first data object 141 stored to an object addressable storage (OAS) system 120, according to an example embodiment of the present invention. The system of FIG. 1 may be described in conjunction with the flow diagrams of FIGS. 3A-5 illustrating methods according to respective example embodiments of the present invention.

Figure 3A:
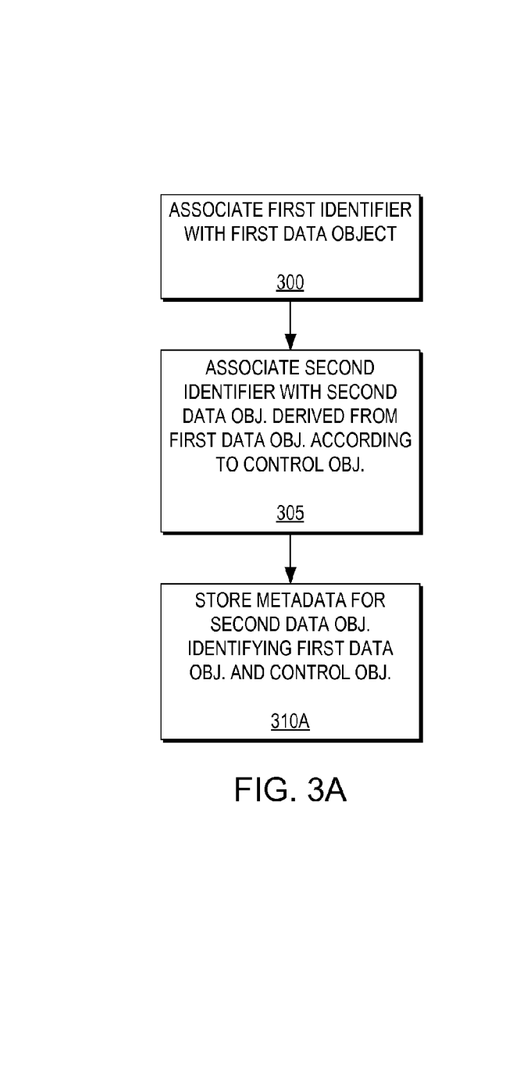

As illustrated in FIGS. 1 and 3A, a host computer 110 may send (1) a first data object 141 to an OAS system 120 for storage. The OAS system 120 may include a manager 150 comprising an identification module 160, a transformation module 170, and an analysis module 180. A receiver module 130 in the OAS system 120 may receive the first data object 141 and the identification module 160 may associate a first identifier with the first data object 141 in the OAS datastore 140 (300). It should be understood that the first data object 141 may have an associated second data object 142 derived from the first data object 141 according to a control object 143. The transformation module 170 then may associate a second identifier with the second data object 142 in the OAS datastore 140 (305). The transformation module 170 also may store metadata for the second data object 142 identifying the first data object 141 and the control object 143 (310A).

Figure 3B:
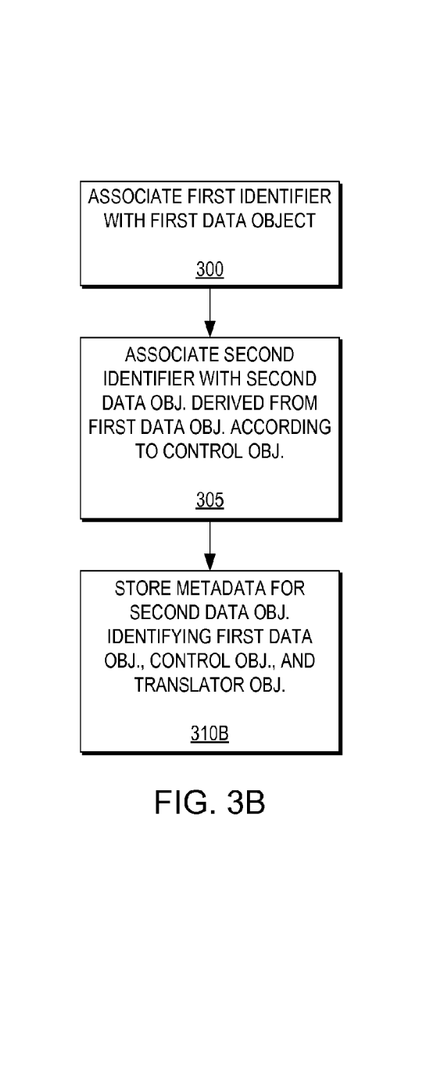
Figure 3C:
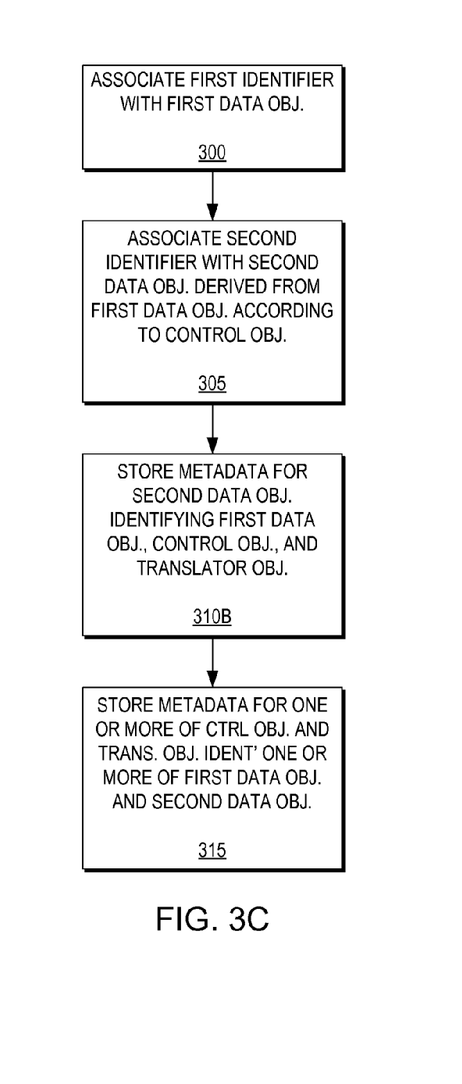

As illustrated in FIGS. 1 and 3B, in certain embodiments, the transformation module 170 also may store metadata for the second data object 142 identifying the first data object 141, the control object 143, and a translator object 144 according to which the second data object 142 was derived from the first data object 141 (310B). As illustrated in FIGS. 1 and 3C, in yet other embodiments, the transformation module 170 also may store metadata for one or more of the control object 143 and the translator object 144 identifying one or more of the first data object 141 and the second data object 142 (315).

Figure 2:
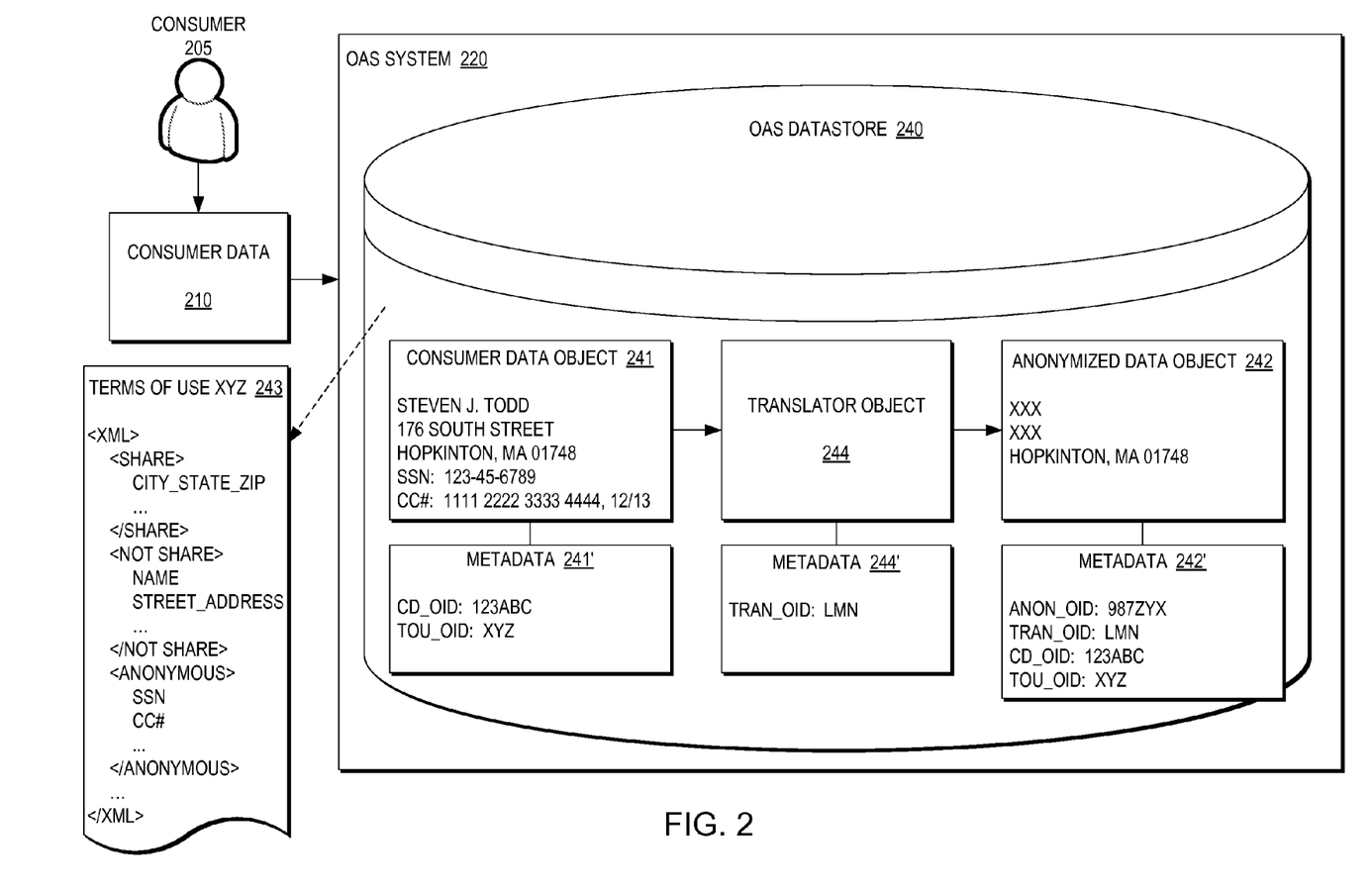
FIG. 2 is a logic flow illustrating storing consumer data in an OAS system while maintaining data privacy and privacy auditing via a provenance-aware system according to an example embodiment of the present invention.

FIG. 2 is a logic flow illustrating storing consumer data 210 from a consumer 205 in an OAS system 220 while maintaining data privacy and privacy auditing via a provenance-aware system 220 according to an example embodiment of the present invention. As illustrated in FIG. 2, the first data object (e.g., first data object 141 of FIG. 1) may be a data item object (e.g., consumer data object 241 of FIG. 2), the second data object (e.g., second data object 142 of FIG. 1) may be a transformed data object (e.g., anonymized data object 242 of FIG. 2), and the control object (e.g., control object 143 of FIG. 1) may a terms of use object 243.

As illustrated in FIG. 2, a consumer 205 with piece of consumer data 210 is trusting it to a provider (not shown) to be stored to the provider's data center (not shown) including an OAS system 220. Typically, in such scenarios, the consumer 205 has agreed to a terms of service or terms of use 243. As understood in the art, the terms of use 243 may govern how data is stored in a data center (i.e., OAS datastore 240) and how it may be transformed in the data center.

Typically, a consumer 205 contributing consumer data 210 to a data center operator clicks on the "terms of use" that describes the data they will contribute, the planned usage of that data by the data center operator, a description of sharing of the data with third parties, integration, lifetime of data, anonymization/commitment to non-reidentification, etc. These terms of use 243 may be stored on the OAS system 220 and a unique address (TOU_OID) may be generated. The specific consumer 205 is then associated with this TOU_OID in the data center operator database. Consumer data 210 flows into the data center operator and is stored in the OAS system 220 and is given a Consumer Data OID (CD_OID). The meta-data for this consumer content contains a pointer to the TOU_OID for the terms of use 243, establishing an immutable linkage to generated data 241 and the terms of use 243.

As illustrated in FIG. 2, the terms of use 243 may be stored as an object in the OAS datastore 240 and have an TOU_OID of, for example, XYZ. The terms of use 243 may be, for example, an XML document, and may describe different levels of use of consumer data 210. For example, the terms of use 243 may define with whom (e.g., white list parties) the data center operator may share consumer data 210 and which consumer data 210 may be shared (e.g., data items/types), with whom (e.g., black list parties) the data center operator may not share consumer data 210, and what consumer data items/types must always remain anonymous regardless of the target sharing party (e.g., sensitive data/personally identifiable information, such as social security number, street address, etc.).

The OAS system 220 may receive the consumer data 210 and store the consumer data 210 in the OAS datastore 240 as a consumer data object 241. For example, the consumer data object may include consumer name, address, social security number, and credit card information. As illustrated in FIG. 2, the OAS system 220 may store the consumer data object 241 with metadata 241' defining an CD_OID (e.g., 123ABC) for the consumer data object 241 as well as a terms of use TOU_ID (e.g., XYZ) for the terms of use 243 under which the consumer data 210 was submitted to the OAS system 220.

A transformation module (not shown, transformation module 170 of FIG. 1) may identify the terms of use 243 according to the TOU_OID for the terms of use stored as metadata 241' for the consumer data object 241 and retrieve both the consumer data object 241 and the terms of use 243. The transformation module then may employ a translator object 244 to create an anonymized data object 242 according to the consumer data object 241 and the terms of use 243. The transformation module then may store the anonymized data object 242 to the OAS datastore 240 including metadata 242' identifying the anonymized data object ANON_OID (e.g., 987ZYX), the parent consumer data object CD_OID (e.g., 123ABC), and the TOU_OID (e.g., XYZ) for the terms of use 243 under which the anonymized data object 242 was created. In other embodiments, the transformation module may store a TRAN_OID (e.g., LMN) as additional metadata 242' identifying the translator object 244 which created the anonymized data object 242 from the consumer data object 241. Therefore, it should be understood that the terms of use 243 may be linked to both the parent consumer data object 241 via its metadata 241' and traversed to view all transformations (e.g., anonymized data objects 242 via metadata 242') and translator objects 244 via the anonymized data object metadata 242'.

Figure 4:
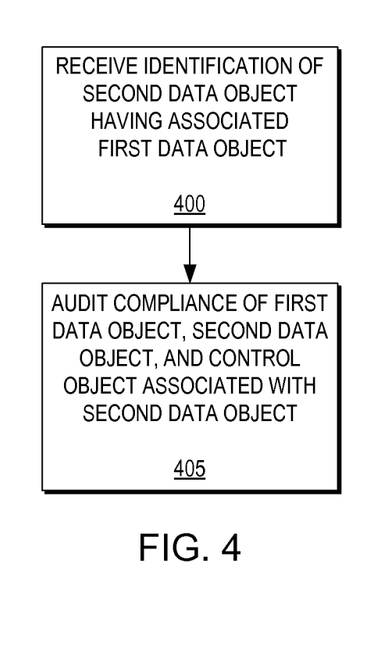

As understood in the art, a data center operator may perform data analytics on the plurality of third data objects to gather business insight. Further, the data center operator or a third party may audit compliance of one or more of the third data objects according to the respective first data objects and respective associated second data objects. For example, the data center operator or other party may receive an identification of a second data object 242 having an associated first data object 241 (400) and audit compliance of the first second data object 242 according to the first data object 241 and the control object 243 (405). Similar to the translator object 244, an analytics object may be stored in the OAS datastore 240 and may have an analytics object ID (A_OID). Consumer data objects may be run against an analytics object and, when complete, the results may be stored in an analytics results object having an analytics results object ID (AR_OID). This AR_OID, as part of its immutable metadata, contains pointers to any CD_OIDs and A_OIDS (as well as TOU_OIDs, if desired).

Example embodiments of the present invention also may be useful to a datacenter operator for monetization or other exploitation of consumer data 210. For example, if a datacenter operator has a plurality of consumer data objects 241, the datacenter operator may extract marketing value out of the data and sell it. However, the datacenter operator is bound to consumers 205 by one or more terms of use 243 under which the consumers 205 provided consumer data 210. Accordingly, the datacenter provider may anonymize the data, as described above, in accordance with the terms of use 243. The datacenter operator then may perform analytics on the anonymized data objects 242 to gather business insight.

Figure 5:
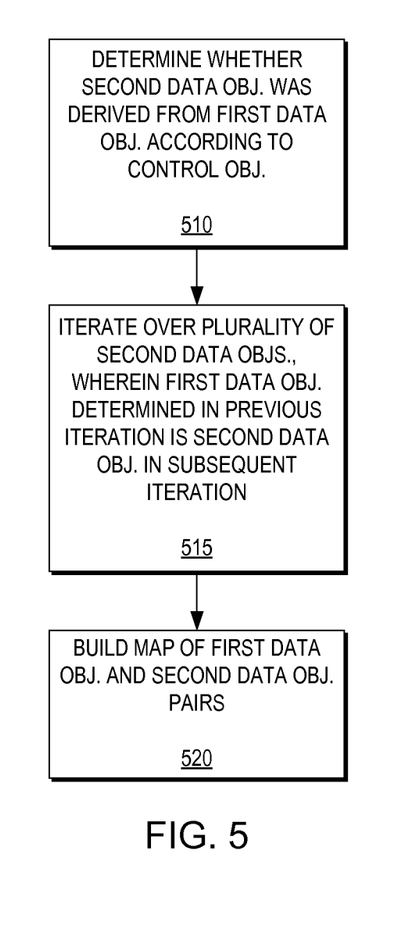

It should be understood that each time the datacenter operator transforms a consumer data object 241 into, for example, an anonymized data object 242, the metadata properties of the OAS datastore 240 create a lineage map. Accordingly, example embodiments of the present invention may be useful for auditing of data center provider privacy practices, by the datacenter provider, consumers, and third parties. For example, as illustrated in FIG. 5, the datacenter operator, for example, may determine whether a second data object 242 was derived from a first data object 241 according to a control object 243 according to the stored metadata (510). In certain embodiments, example embodiments of the present invention may iterate over a plurality of successive data objects. For example, a first data object 241 determined to comply in a previous iteration may be used a second data object 242 in a subsequent iteration (515). A map then may be built of successive first data object 241 and second data object 242 pairs (520).

In certain embodiments, the datacenter operator may periodically monitor its privacy practices according to the provenance/data lineage auditability framework according to example embodiments of the present invention. For example, the datacenter provider may execute an auditing program in the OAS system 220 to select a subset of terms of use records 243 and authoritatively point to all anonymized (i.e., transformed) data objects 242 related to those terms of use objects 243.

Additionally, in other embodiments, a consumer 205 may wish to confirm that their address, which, for example, was guaranteed to be anonymized according to a terms of use 243, is not present anywhere in the OAS system 220 other than the original ingested consumer data object 241. Accordingly, the consumer 205 may perform a search of all ANON_OIDs outputs for the address. If the address is found, the consumer 205 can trace back the lineage of the result (e.g., via one or more of the TRAN_OID, the CD_OID, and the TOU_OID) to prove that the datacenter operator did not comply with its own terms of use 243.

Further, in yet other example embodiments, a third party auditor may wish to determine whether the datacenter operator is complying with privacy terms of use 243. Accordingly, the third party auditor may ask the datacenter operator for the terms of use objects 243 for a specific consumer 205 or random sample and receive a list of applicable TOU_OIDs. The third party auditor then may acquire the initial consumer data objects 241 (CD_OIDs) and navigate the lineage path downwards and inspect the results of transformations 242 (e.g., anonymized data objects), if any, to confirm that the terms of use 243 are being met. Moreover, the third party auditor may wish to manually input their own data into the OAS datastore 240 to determine if any step of the datacenter operator's anonymization or analytic processes violates a specific term of use.

Figure 6:
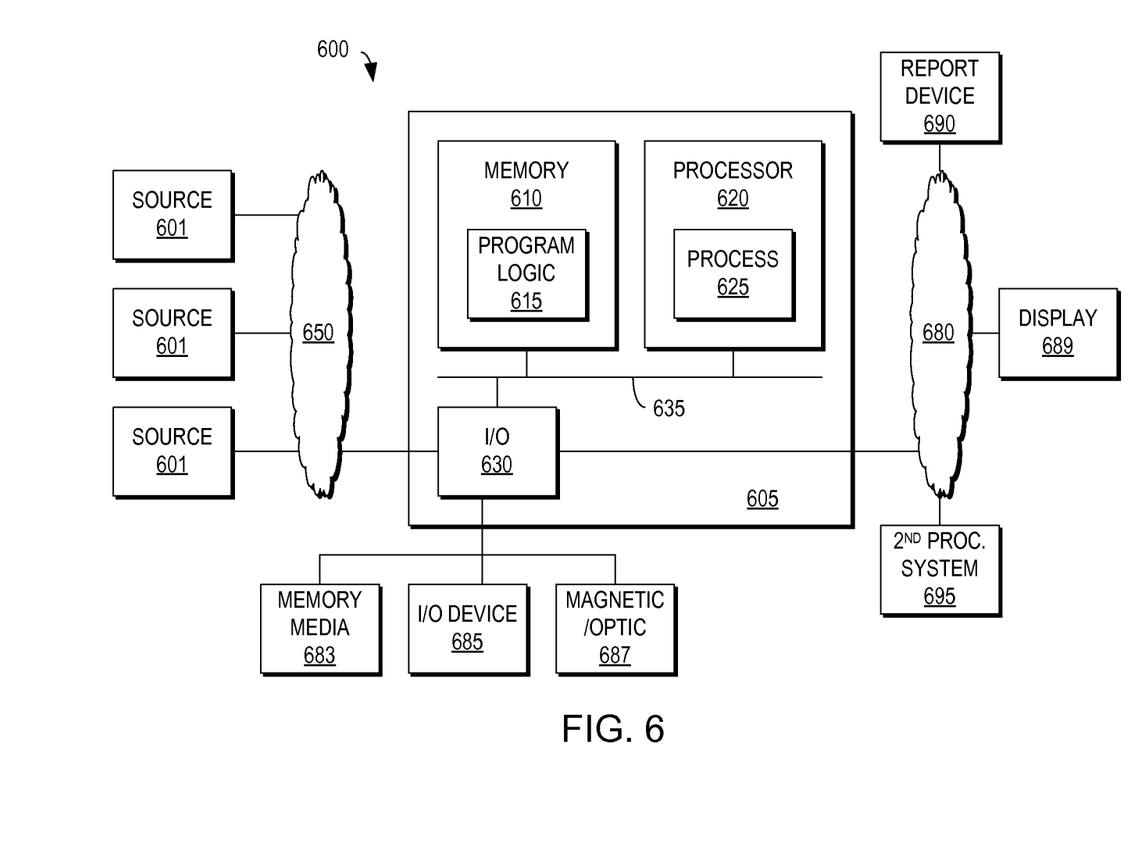
FIG. 6 is a block diagram of an example embodiment apparatus according to the present invention.

FIG. 6 is a block diagram of an example embodiment apparatus 605 according to the present invention. The apparatus 605 may be part of a system 600 and includes memory 610 storing program logic 615, a processor 620 for executing a process 625, and a communications I/O interface 630, connected via a bus 635.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 7:
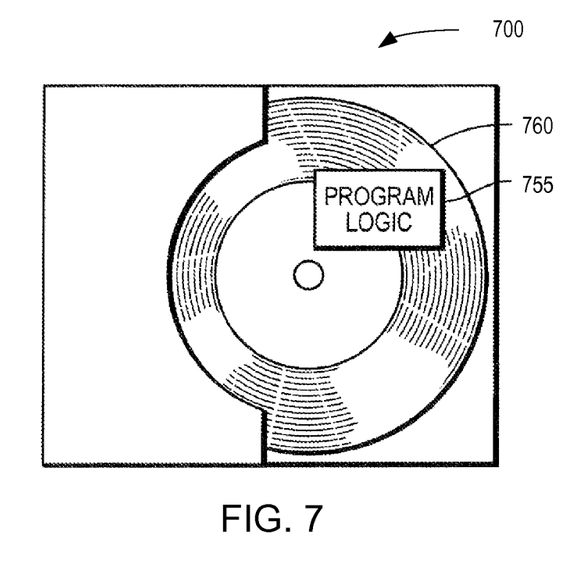
FIG. 7 is an illustration of an example embodiment of the present invention as embodied in program code.

FIG. 7 shows program logic 755 embodied on a computer-readable medium 760 as shown, and wherein the logic 755 is encoded in computer-executable code configured for carrying out the methods of this invention, thereby forming a computer program product 700.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Embodiments of the present invention have been described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "provenance" refers to an indication or determination of where a given object, item or thing came from, or an indication or determination of one or more objects, items or things from which the given object, item or thing was derived. That is, the term "provenance" refers to the history or lineage of a given object, item or thing (or multiple objects, items and things). Thus, "provenance information" or "provenance data" (also referred to herein as "provenance metadata") is information or data that provides this indication or results of such determination.

Furthermore, as used herein, the phrase "data object" or simply "object" refers to any given data item or data unit that may be part of an information network. An object or data object may take on any form and it is to be understood that the invention is not limited to any particular form. For example, an object may be electronic data such as one or more web pages, documents, records, files, images, videos, or any other type of data set, data item, or data unit. Thus, embodiments of the invention are not limited to any particular type of data object.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims. For example, it should be understood that the second data object may be any type of control data object, such as a software license having license obligations that must be complied with at a software build time, or customer requirements, such as preferred cloud infrastructure vendors, or certain types of open source software (e.g., under certain types of open source licenses) that may not be use in a product).

What is claimed is:

1. A computer-implemented method comprising:
associating a first identifier with a first data object in an object addressable storage (OAS) datastore, wherein the first data object includes consumer data;
associating a second identifier with a second data object in the OAS datastore, the second data object derived from the first data object according to a control object in the OAS datastore, wherein the second data object is an anonymized data object, and the control object is a terms of use object;
storing metadata in the OAS datastore for the second data object, wherein the metadata includes one or more content addresses for identifying the first data object and identifying the control object according to which the second data object was derived from the first data object;
creating a lineage map based on the stored metadata;
wherein the second data object is derived from the first data object by a translator object; and further comprising:
storing metadata for the second data object identifying the translator object.

2. The method of claim 1 further comprising storing metadata for one or more of the control object and the translator object identifying one or more of the first data object and the second data object.

3. The method of claim 1 further comprising, for a plurality of second data objects, performing data analytics on the plurality of second data objects.

4. The method of claim 1 further comprising auditing compliance of the second data object with a control object identified in metadata for the second data object.

5. A method comprising:
receiving metadata from an object addressable storage (OAS) datastore for a second data object, the second data object having an associated first data object, wherein the data objects are stored in the OAS datastore as pairs according to respective control objects according to which each derived data object is derived from its respective first data object, wherein the first data object includes consumer data, and wherein the second data object is an anonymized data object, and the control object is a terms of use object;
determining whether the second data object was derived from the first data object according to the control object; and
auditing compliance of the first data object, the second data object, and the control object to determine a lineage of the second data object as being derived from the first data object according to the control object;
wherein auditing compliance of the first data object, the second data object, and the control object to determine a lineage of the second data object as being derived according to the control object from the first data object comprises:
iterating over a plurality of second data objects, wherein the first data object determined in a previous iteration is used as the second data object in a subsequent iteration; and
building a map of respective first data object and second data object pairs.

6. The method of claim 5 wherein auditing compliance of the first data object, the second data object, and the control object associated with the second data object to determine a lineage of the second data object as being derived according to the control object from the first data object further comprises auditing the control object according to the first data object and the second data object.

7. The method of claim 5:
wherein the second data object has an associated translator object; and
wherein auditing compliance of the first data object, the second data object, and the control object to determine a lineage of the second data object as being derived according to the control object from the first data object associated with the second data object further comprises auditing the translator object according to the first data object and the second data object.

8. A system comprising:
an OAS datastore;
one or more processors; and
memory storing computer executable code that when executed on the one or more processors performs the operations of:
associating a first identifier with a first data object in the OAS datastore, wherein the first data object includes consumer data;
associating a second identifier with a second data object in the OAS datastore, the second data object derived from the first data object according to a control object in the OAS datastore, wherein the second data object is an anonymized data object, and the control object is a terms of use object;
storing metadata in the OAS datastore for the second data object, wherein the metadata includes one or more content addresses for identifying the first data object and identifying the control object according to which the second data object was derived from the first data object; and
creating a lineage map based on the stored metadata;
wherein the second data object is derived from the first data object by a translator object; and
wherein the memory further stores computer executable code that when executed on the one or more processors performs the operation of storing metadata for the second data object identifying the translator object.

9. The system of claim 8 wherein the memory further stores computer executable code that when executed on the one or more processors performs the operation of storing metadata for one or more of the control object and the translator object identifying one or more of the first data object and the second data object.

10. The system of claim 8 wherein the memory further stores computer executable code that when executed on the one or more processors performs, for a plurality of second data objects, data analytics on the plurality of second data objects.

11. The system of claim 8 wherein the memory further stores computer executable code that when executed on the one or more processors performs the operation of auditing compliance of the second data object with a control object identified in metadata for the second data object.

12. A system comprising:
an object addressable storage (OAS) datastore;
one or more processors; and
memory storing computer executable code that when executed on the one or more processors performs the operations of:
receiving metadata from the OAS datastore for a second data object, the second data object having an associated first data object, wherein the data objects are stored in the OAS datastore as pairs according to respective control objects according to which the derived data object is derived from its respective first data object, wherein the first data object includes consumer data, and wherein the second data object is an anonymized data object, and the control object is a terms of use object;
determining whether the second data object was derived from the first data object according to the control object; and
auditing compliance of the first data object, the second data object, and the control object to determine a lineage of the second data object as being derived from the first data object according to the control object;
wherein auditing compliance of the first data object, the second data object, and the control object to determine a lineage of the second data object as being derived according to the control object from the first data object comprises:
iterating over a plurality of second data objects, wherein the first data object determined in a previous iteration is used as the second data object in a subsequent iteration; and
building a map of respective first data object and second data object pairs.

13. The system of claim 12 wherein auditing compliance of the first data object, the second data object, and the control object associated with the second data object to determine a lineage of the second data object as being derived according to the control object from the first data object further comprises auditing the control object according to the first data object and the second data object.

14. The system of claim 12:
wherein the second data object has an associated translator object; and
wherein auditing compliance of the first data object, the second data object, and the control object to determine a lineage of the second data object as being derived according to the control object from the first data object associated with the second data object further comprises auditing the translator object according to the first data object and the second data object.

15. A non-transitory computer readable storage medium including computer program code stored thereon that, when executed on a processor of a computer, causes the computer to provide privacy audit support, the computer program product comprising:
computer program code for associating a first identifier with a first data object in an object addressable storage (OAS) datastore, wherein the first data object includes consumer data;
computer program code for associating a second identifier with a second data object in the OAS datastore, the second data object derived from the first data object according to a control object in the OAS datastore, wherein the second data object is an anonymized data object, and the control object is a terms of use object;
computer program code for storing metadata in the OAS datastore for the second data object, wherein the metadata include one or more content addresses for identifying the first data object and identifying the control object according to which the second data object was derived from the first data object;
computer program code for creating a lineage map based on the stored metadata;
wherein the second data object is derived from the first data object by a translator object; and further comprising:
computer program code for storing metadata for the second data object identifying the translator object.

16. The non-transitory computer readable storage medium of claim 15 further comprising computer program code for storing metadata for one or more of the control object and the translator object identifying one or more of the first data object and the second data object.

17. The non-transitory computer readable storage medium of claim 15 further comprising computer program code for auditing compliance of the second data object with a control object identified in metadata for the second data object.

18. A non-transitory computer readable storage medium including computer program code stored thereon that, when executed on a processor of a computer, causes the computer to provide privacy audit support, the computer program product comprising:
   computer program code for determining whether a second data object in an object addressable storage (OAS) datastore, having an associated first data object in the OAS datastore and an associated control object in the OAS datastore, was derived from the first data object according to the control object, and first data object stored in the OAS datastore, wherein the first data object includes consumer data, and wherein the second data object is an anonymized data object, and the control object includes a terms of use object;
   computer program code for auditing compliance of the first data object, the second data object, and the control object to determine a lineage of the second data object as being derived from the first data object according to the control object;
   computer program code for iterating over a plurality of second data objects, wherein the first data object determined in a previous iteration is used as the second data object in a subsequent iteration; and
   computer program code for building a map of respective first data object and second data object pairs.

19. The non-transitory computer readable storage medium of claim 18 wherein auditing compliance of the first data object, the second data object, and the control object associated with the second data object to determine a lineage of the second data object as being derived according to the control object from the first data object comprises auditing the control object according to the first data object and the second data object.

20. The non-transitory computer readable storage medium of claim 18:
   wherein the second data object has an associated translator object; and
   wherein auditing compliance of the first data object, the second data object, and the control object to determine a lineage of the second data object as being derived according to the control object from the first data object associated with the second data object comprises auditing the translator object according to the first data object and the second data object.

* * * * *